United States Patent [19]

Olsson

[11] 4,248,666
[45] Feb. 3, 1981

[54] METHOD OF DETECTING LEAKAGE OF RADIOACTIVE GAS FROM A NUCLEAR FUEL ASSEMBLY

[75] Inventor: Torsten Olsson, Vesteras, Sweden

[73] Assignee: Aktiebolaget Asea-Atom, Sweden

[21] Appl. No.: 903,301

[22] Filed: May 5, 1978

[30] Foreign Application Priority Data

May 6, 1977 [SE] Sweden .............................. 7705283

[51] Int. Cl.² ............................................ G21C 17/00
[52] U.S. Cl. ................................................ 176/19 LD
[58] Field of Search .......................... 176/19 LD, 19 R

[56] References Cited

U.S. PATENT DOCUMENTS

| | | | |
|---|---|---|---|
| 3,419,467 | 12/1968 | Holzer et al. | 176/19 LD |
| 3,762,993 | 10/1973 | Jones | 176/19 LD |
| 3,943,365 | 3/1976 | Aristarkhov et al. | 176/19 LD |
| 4,016,249 | 4/1977 | Wachter | 176/19 LD |
| 4,034,599 | 7/1977 | Osborne | 176/19 LD |
| 4,039,376 | 8/1977 | Wachter | 176/19 LD |
| 4,072,559 | 2/1978 | Neidl et al. | 176/19 LD |
| 4,082,607 | 4/1978 | Divona | 176/19 LD |
| 4,147,587 | 4/1979 | Utamura et al. | 176/19 LD |

FOREIGN PATENT DOCUMENTS 661537  4/1963  Canada .............................. 176/19 LD

OTHER PUBLICATIONS

Nucleonics (7/61) pp. 84, 86, 89 Osborne.

Primary Examiner—S. A. Cangialosi
Attorney, Agent, or Firm—Pollock, Vande Sande & Priddy

[57] ABSTRACT

A method for simultaneously testing a plurality of fuel rod assemblies for leakage of radioactive gas, comprising the steps of removing the cover from a nuclear vessel containing the fuel rods, positioning a fixture over the fuel rods, reducing the hydrostatic pressure surrounding the fuel rods allowing gas to leak into the surrounding water, collecting water from about each fuel rod assembly in a separate chamber, separating gas from the water and testing the gas for the presence of radioactivity.

11 Claims, 4 Drawing Figures

1

METHOD OF DETECTING LEAKAGE OF RADIOACTIVE GAS FROM A NUCLEAR FUEL ASSEMBLY

BACKGROUND OF THE INVENTION

This invention relates to a method and apparatus for detecting the leakage of radioactive gas from a fuel assembly of a nuclear reactor. In particular, the present invention concerns a novel method of simultaneously testing a plurality of fuel rod assemblies to determine which, if any, are giving off radioactive gas produced in leaking fuel rods While detecting devices have been used with nuclear reactors, known detectors have proven both complex and inefficient. For example, U.S. Pat. No. 3,762,993 issued Oct. 2, 1973 to Jones provides a complex detection assembly which separates several of the fuel rod assemblies for testing by lifting them from the reactor core. Since only one or a few of the fuel rod assemblies can be lifted at a time, the total testing time is relatively great, particularly if all of the fuel rod assemblies in the reactor core are examined. Because the reactor must be shut down during the testing period, the prolonged time required for testing by the Jones device has proven to be very costly with respect to the efficient operation of the reactor.

As will be discussed in detail hereinafter, applicant's new and useful invention solves the problems confronting Jones' and similar known devices, while at the same time providing a novel method and apparatus for simultaneously testing all of the fuel rod assemblies for leakage of radioactive gas. The present invention is capable of identifying which fuel rod assemblies, if any, are leaking radioactive gas without the need for physically separating individual fuel rod assemblies from the nuclear core.

OBJECTS AND SUMMARY OF THE PRESENT INVENTION

An object of the present invention is to provide a method of detecting radioactive gas given off from a fuel assembly of a nuclear reactor to one or several leaking fuel rods belonging to the fuel assembly.

A further object of the present invention is to provide a method for simultaneously examining a plurality of fuel rod assemblies for the leakage and source of radioactive gas.

Another object of the present invention is to provide a method of leak detecting which allows the fuel rod assemblies to remain in the nuclear core.

Another object of the present invention is to provide a novel apparatus for testing the fuel assemblies of a nuclear reactor for radioactive gas leaks.

A preferred embodiment of the present invention is directed to a method for detecting radioactive gas leaks comprising the steps of: removing a reactor cover and exposing a plurality of fuel rod assemblies, positioning a common gas collecting assembly over a pre-selected number of the fuel rod assemblies and collecting gas samples from the fuel rod assemblies for radiation testing.

The method and apparatus of the present invention will become apparent from a reading of the following specification and claims, together with the accompanying drawings, wherein similar elements are referred to and are indicated by similar reference numerals.

BRIEF DESCRIPTION OF THE DRAWINGS

The present invention can be best understood with reference to the accompanying drawings, wherein.

DETAILED DESCRIPTION OF THE PREFERRED EMBODIMENT

Figure 1:
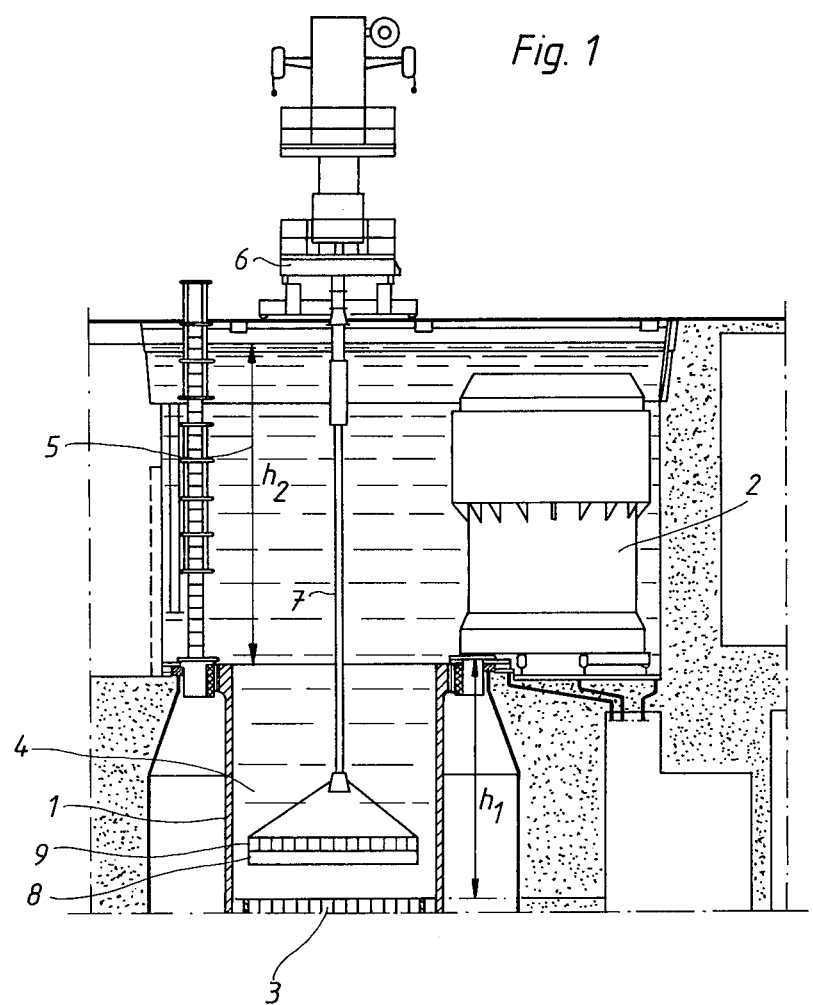
FIG. 1 shows a cross-sectional view of a nuclear reactor, including a reactor vessel.

The novel method of the present invention will be explained with the aid of FIGS. 1–4. Referring to FIG. 1, a reactor vessel portion of a nuclear reactor is designated 1. Reactor vessel 1 includes a cover 2, which has been removed for reasons which will become clear hereafter. A plurality of separate fuel rod assemblies (not shown in FIG. 1) extend vertically through reactor vessel 1 and are fixedly positioned relative to one another by a core grid 3.

A volume of water 4 is positioned vertically above core grid 3 and fills an end portion of reactor vessel 1. A further volume of water 5 is positioned vertically above, and in fluid communication with water volume 4. Water volume 5 fills a reactor pool and is particularly intended to provide radiation protection. Water volume 4 has a height designated as $h_1$ while water volume 5 has a height designated $h_2$. Water pressure on the upper edge of the grid 3 and the fuel rod assemblies is directly dependent on the sum of the pressures 4 and 5 indicated by $h_1$ and $h_2$. In other words, the water pressure at the upper edge of the core grid 3 can be expressed by units of water column equal to $h_1 + h_2$.

A conventional work platform 6 is positioned vertically above water volume 5, with platform 6 including a telescopic grip 7 selectively extendable in the direction of core grid 3. Attached to grip 7 is a fixture 8 with a plurality of attached gas collecting hoods 9. Fixture 8 may be selectively designed with any number of hoods 9, to allow for the testing of a any number of fuel rod assemblies as will be explained.

Figure 4:
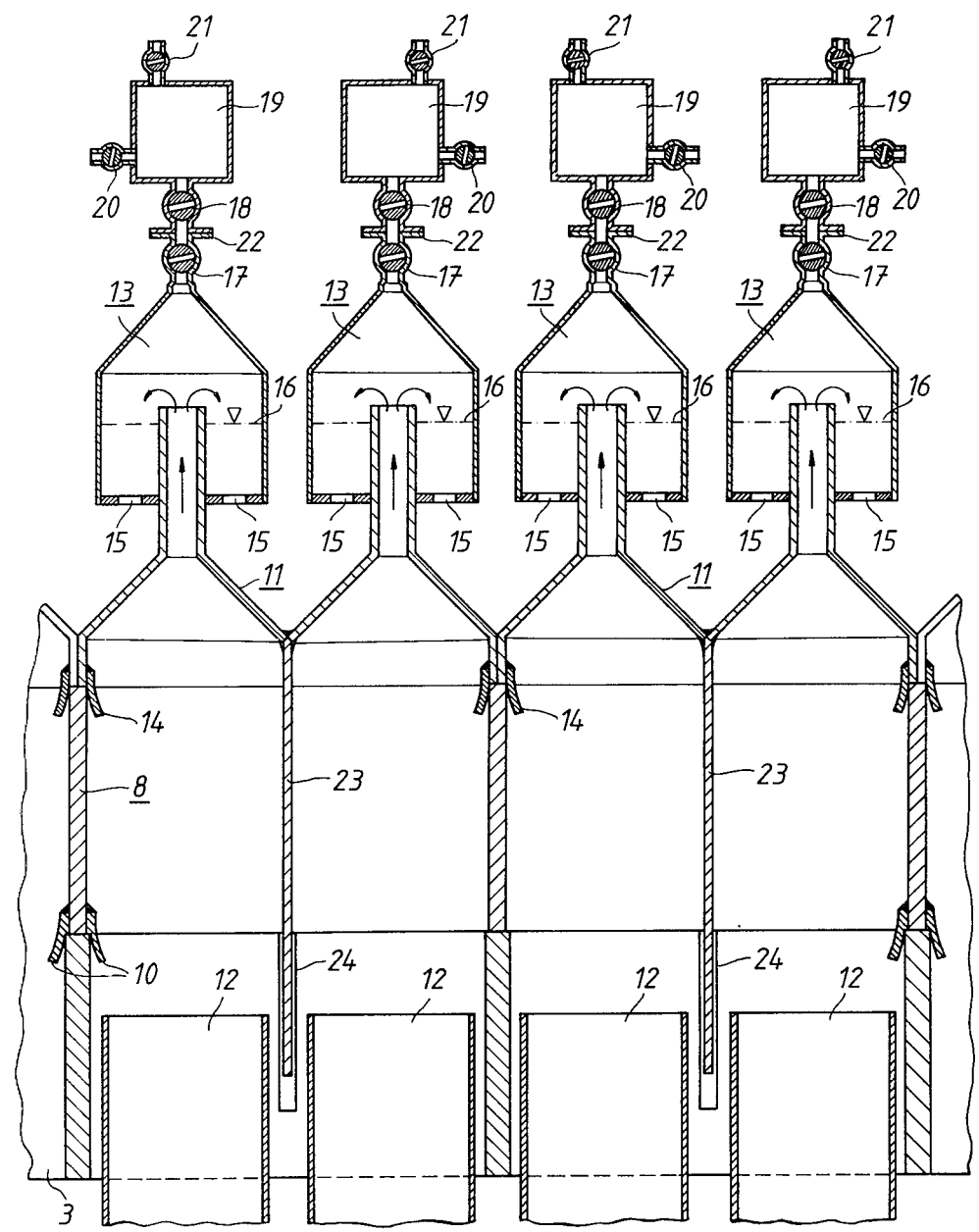
FIG. 4 shows an alternative embodiment as compared to FIG. 2.

As shown in FIG. 4, fixture 8 appears as a lattice including a plurality of nodal points. In a similar manner, core grid 3 also appears as a lattice with a plurality of nodal points. As fixture 8 and core grid 3 are brought together, their lattices are brought into coinciding relationship via a pair of guide lips 10 welded to an end of fixture 8 and extending on either side of core grid 3.

In a preferred embodiment, the lattice of fixture 8 comprises a plurality of squares, with each square corresponding in position to a group of fuel rod assemblies 12. For example, each square may correspond to four fuel assemblies 12. Each square includes an attached end section positioned opposite from fuel assemblies 12. The end section includes a plurality of funnel-shaped collecting surfaces 11, with an aperture being formed through the center of each funnel 11. Each collecting funnel 11 aligns with a separate fuel rod assembly 12, as the entire end section is guided into engagement with fixture 8 by a pair of guide lips 14 attached to the closed end portion and extending on opposite sides of fixture 8.

Each funnel 11 extends into a separate collecting space 13 formed within one of a plurality of first chambers. At least one aperture 15 extends through a vertically bottom wall of each first chamber. A plurality of separate, second chambers are each in fluid communication with one of the first chambers via a fluid passageway. Each second chamber forms a collecting space 19, with a pair of valves 17 and 18 positioned in the fluid passageway between each pair of collecting spaces 13 and 19. Two further passageways joining collecting space are controlled by valves 20 and 21, respectively. A plurality of screens 23 extend from the end section attached to fixture 8 into guide bars 24 positioned between fuel rod assemblies 12 to ensure the gas collected from each fuel rod assembly 12 is directed to a separate testing station. Each collecting hood 9 along with its respective funnels 11 and collecting spaces 13 form a collecting hood assembly positionably adjacent to a vertically upper end of at least one of said fuel rod assemblies for collecting leaking gas within said collecting hood assembly.

A method for detecting the leakage of radioactive gas will now be described with reference to FIGS. 1 and 4. The reactor is first shut down and the water volume 5 is pumped into a storage pool. Following this, the reactor vessel cover 2, as well as the steam separator and steam drier, are removed. Thereafter, a water volume 5 is again established within the reactor pool, reaching a height $h_2$ over the upper edge of reactor vessel 1, with $h_2$ preferably being chosen as a maximum value.

Fixture 8 with funnels 11 mounted thereon is lifted into the reactor vessel 1 by manipulation of grip 7. Fixture 8 aligns with and engages core grid 3 as shown in FIG. 4. Thereafter, the total water volume 4+5 is reduced. It may be sufficient to reduce the maximum water height $h_1 + h_2$ by as little as 10% but, preferably the reduction should at least be 30% of the maximum value of $h_1 + h_2$.

As the height $h_1 + h_2$ of the water is reduced, the hydrostatic pressure against the rods of the fuel assemblies 12 is also reduced. Because the hydrostatic pressure against the rods of the fuel assemblies 12 is reduced, radioactive gas produced within the rods of the fuel assemblies 12 flows through any non-fluid tight surfaces of the fuel rods into the surrounding water. The water, contaminated by the radioactive gas, undergoes vertical motion due to the decay power of the reactor, with the water around each fuel assembly 12 flowing through a separate funnel 11 into a respective collecting space 13. Because the water is in motion, it flows through aperture 15 back toward fuel assemblies 12.

The radioactive gas which leaks into the water as a result of the hydrostatic pressure reduction is carried with the water stream into collecting space 13, where it separates and collects above water line 16. Valves 17 and 18 are selectively opened while valves 20 and 21 remain closed, allowing the radioactive gas to rise into second chamber 19.

When the desired reduction in the volume of water $h_1 + h_2$ has taken place above the reactor core 1, water is pumped back into reactor pool 5 to a normal operating level. Fixture 8 is then lifted via grip 7 from the reactor vessel 1 through the reactor pool. It should be noted that the attached collecting funnels 11 remain below the surface of water volume 5.

In order to investigate the gas contained within collecting spaces 19 for radioactivity, valves 20 and 21 may be opened with the gas passing through a circulation circuit including a gas circulating pump and a radioactivity detector. In an alternative method, valves 17 and 18 may be closed, with the chambers forming collecting spaces 19 being separated from the chambers forming collecting spaces 13 at a plurality of connecting flanges 22. The sampling chambers including collecting spaces 19 are then transported to a laboratory for examination.

Figure 2:
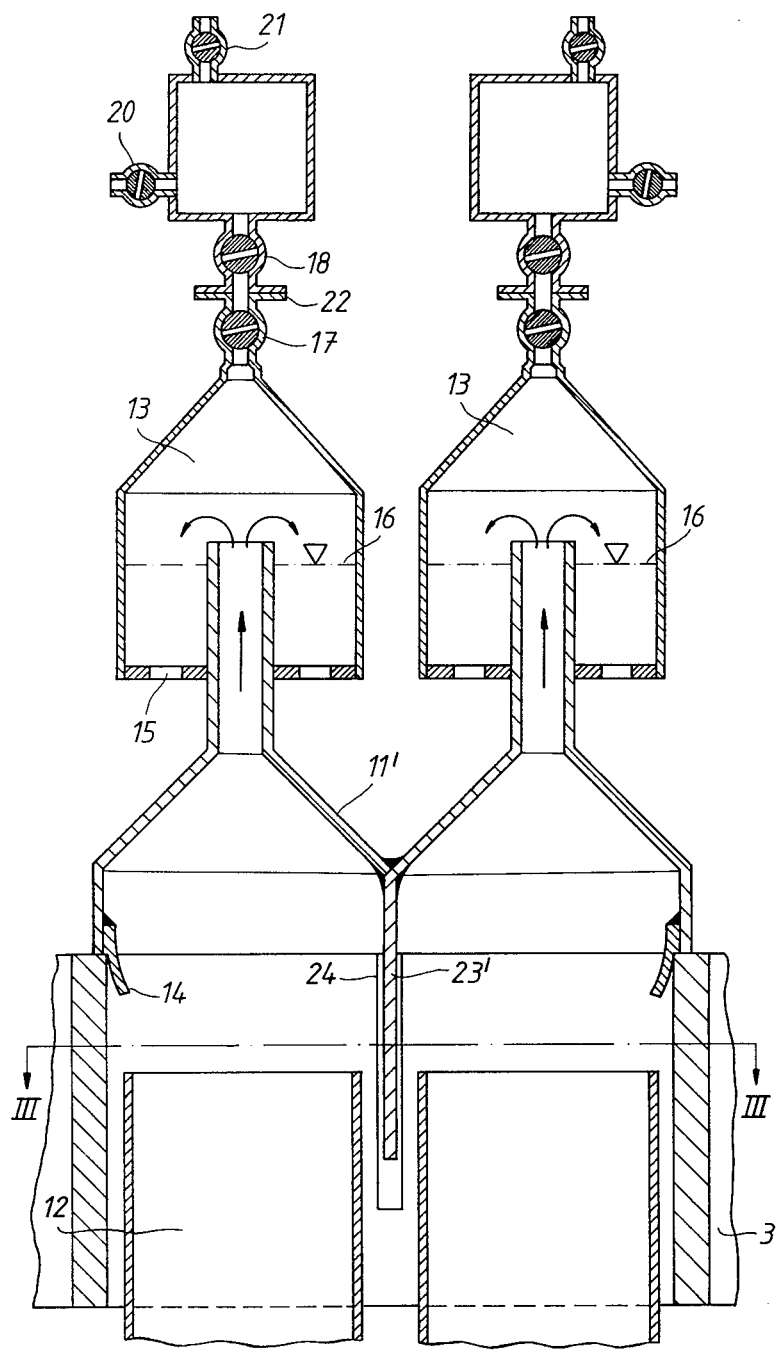
FIG. 2 shows a vertical section of apparatus for carrying out the method of the preferred embodiment.
Figure 3:
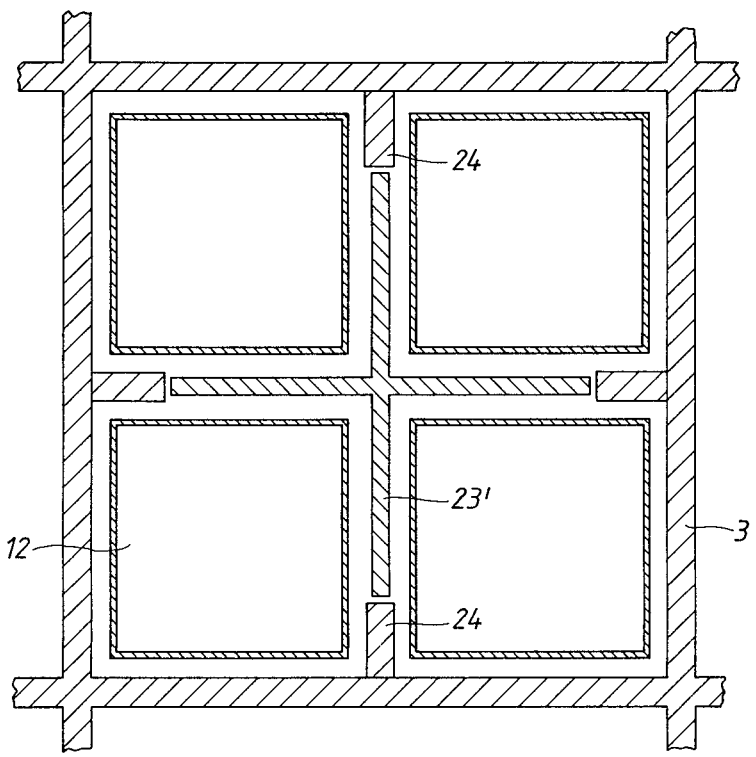
FIG. 3 shows a section along line III—III of FIG. 2.

Referring to FIGS. 2 and 3, an alternative embodiment of the apparatus of the present invention will now be described. In this embodiment, fixture 8 has been eliminated, with an end section including a plurality of funnels 11' being directly attached to core grid 3. A plurality of screens 23' are attached to the end section between the funnels 11' and extend into engagement with a plurality of guide bars 24 positioned between adjacent fuel rod assemblies 12.

In a further preferred embodiment, a plurality of fixtures may be used in place of a single fixture. If four fixtures were used, at least 25% of the core grid modules would be simultaneously covered with the collecting funnels 11. It would also be within the scope of the present invention to permanently attach the end portion including funnels 11 to fixture 8 by welding. Furthermore, it is within the scope of the present invention to cover only part of the core grid 3 with collecting funnels 11 when it is desirable to selectively test a limited number of fuel rods 11 for leakage.

The present invention is not limited to the above-described embodiments, but is to be limited only by the scope of the following claims.

What is claimed is:

1. A method of detecting leakage of radioactive gas from fuel rod assemblies positioned in a reactor vessel within a supporting core grid, without removal of said fuel rod assemblies from their normal positions within a nuclear reactor core, comprising the steps of:
   terminating operation of said nuclear vessel and then removing a cover from said reactor vessel;
   exposing said fuel rod assemblies to a pool of water having a predetermined hydrostatic pressure;
   positioning a collecting hood assembly adjacent to a vertically upper end of a plurality of said fuel rod assemblies, wherein said collecting hood assembly includes a plurality of funnel-shaped passageways each having a first end portion aligned with a specific fuel rod assembly and a second end portion in fluid communication with a corresponding chamber;
   reducing the depth of water positioned vertically above said fuel rod assemblies to reduce said hydrostatic water pressure;
   collecting leaking gas and water within at least one collecting chamber positioned within said collecting hood assembly;
   separating and feeding said water back into said pool of water through at least one exit aperture formed in said collecting chamber, while retaining said gas within said collecting chamber; and
   testing the radioactivity level of said gas remaining in said collecting hood assembly.

2. A method according to claim 1, including the step of aligning a separate collecting compartment within the collector assembly with each of the fuel rod assemblies, wherein leaking gas from any fuel rod forming part of said fuel rod assembly would flow into said aligned collecting compartment.

3. A method according to claim 1, including the step of positioning said fuel rod assemblies within a supporting core grid, and positioning said collecting assembly to cover the upper vertical ends of at least 25% of said fuel rod assemblies.

4. A method according to claim 3, including the step of supporting at least 50% of said fuel rod assemblies within said core grid before reducing said hydrostatic water pressure.

5. Apparatus for detecting a fuel rod assembly having a leaking fuel rod situated in a nuclear reactor core immersed in water, comprising:
   a plurality of fuel rod assemblies immersed in an open water-filled pressure vessel in fluid communication with a water-filled reactor pool situated vertically above said pressure vessel;
   a core grid assembly vertically supporting upper ends of said plurality of fuel rod assemblies;
   means responsive to reducing said reactor pool depth for collecting and identifying radioactive gas given off from fuel rod assemblies;
   said means comprising a collecting hood assembly releasably mounted on said core grid, wherein said collecting hood assembly includes a plurality of funnel-shaped passageways each having a first end portion aligned with a specific fuel rod assembly and further having a second end portion in fluid communication with a corresponding collecting chamber, to allow for the passage of water and gas from said respective fuel rod assembly, through said respective funnel-shaped passageways and into said respective collecting chambers;
   each collecting chamber including at least one exit aperture for allowing water to flow from said collecting chamber while retaining said gas within said collecting chamber.

6. An apparatus according to claim 5, wherein said core grid assembly comprises a plurality of similar modules, with each module supporting a similar number of said fuel rod assemblies.

7. An apparatus according to claim 5, wherein the depth of water in said pool is reduced to correspondingly reduce hydrostatic pressure against outer surfaces of said fuel rod assemblies,
   whereby said radioactive gas flows through non-fluid tight surfaces in said fuel rod assemblies into said surrounding water.

8. An apparatus according to claim 5, wherein said means further comprises a plurality of screens surrounding each of said fuel rod assemblies and contacting said collecting hood to isolate leaking gas from various fuel rod assemblies.

9. An apparatus according to claim 5, wherein said collecting hood covers at least one-half of the fuel rod assemblies.

10. An apparatus according to claim 5, wherein said collecting hood comprises a plurality of modules aligned with a plurality of modules formed by said core grid assembly.

11. An apparatus according to claim 5, wherein said collecting chamber is in fluid communication with a second chamber, with a control valve assembly positioned between said chambers.

* * * * *